United States Patent [19]
White et al.

[11] Patent Number: 5,780,804
[45] Date of Patent: Jul. 14, 1998

[54] APPARATUS AND METHOD FOR MAKING STRUCTURAL FILLET WELDS

[75] Inventors: Raymond Alan White, Schenectady, N.Y.; Eric Russell Willis, San Jose, Calif.

[73] Assignee: General ElectricCompany, Schenectady, N.Y.

[21] Appl. No.: 757,182

[22] Filed: Nov. 27, 1996

[51] Int. Cl.⁶ .................................................. B23K 10/00
[52] U.S. Cl. ............................... 219/121.46; 219/121.45; 219/72; 219/121.43
[58] Field of Search .............. 219/121.45, 121.46, 219/121.43, 121.59, 121.5, 72, 74, 75, 137 R

[56] References Cited

U.S. PATENT DOCUMENTS

| | | | |
|---|---|---|---|
| 4,039,798 | 8/1977 | Lythall et al. | 219/72 |
| 4,052,632 | 10/1977 | Sagara et al. | 219/137 R |
| 4,154,999 | 5/1979 | Pinfold et al. | 219/72 |
| 4,172,974 | 10/1979 | Stingelin et al. | 219/72 |

OTHER PUBLICATIONS

"Report on the Feasibility of Stress Corrosion Crack Repair Using Underwater PTA Welding" by R.A. White, H.D. Solomon, B. Fusaro, R. Cowan, and T.L. Chapman, Aug. 1995—pp. 1–33.

*Primary Examiner*—Mark H. Paschall
*Attorney, Agent, or Firm*—Noreen C. Johnson; Douglas E. Stoner

[57] ABSTRACT

The apparatus of the invention forms a sealed pocket area which excludes water or other liquid fluent directly over a portion of an angled configuration that is to be welded, where the angled configuration is created by teeing two pieces of material together at an angle and joining them by fillet welding.

10 Claims, 4 Drawing Sheets

APPARATUS AND METHOD FOR MAKING STRUCTURAL FILLET WELDS

FIELD OF THE INVENTION

This invention is directed to welding structural parts together that join to form an angled configuration, such as a "T" joint, a corner joint, or a right-angled joint. More particularly, the invention is directed towards an improved apparatus and method for underwater welding of parts that are joined together at an angle to make sound structural fillet welds underwater.

BACKGROUND OF THE INVENTION

Welding is defined as the joining of two or more pieces of metal by applying heat or pressure, or both, with or without the addition of filler metal, to produce a localized union through fusion or recrystallization across the interface. The manufacture and repair of many types of structures require the joining of metal parts by welding. Many of these parts to be welded have angled configurations such as a "T" joint, or two pieces of material joined perpendicular forming a 90 degree angle, or two pieces of material joined at an angle, not necessarily 90 degrees.

It is often necessary to repair or alter metal structures that are submerged under water or other liquid fluent. For instance, hulls of ships, heat transfer systems using liquid as a medium of heat exchange, the construction of offshore oil platforms, and the repair of nuclear reactors, are all applications that could require underwater welding.

In the case of nuclear reactors, being able to weld underwater eliminates the need for draining the reactor and removing the fuel. Welding under water in reactors presents numerous challenges, but the ability to weld without having to drain the reactor and remove the fuel provides a huge cost savings. Welding under water in reactors has been done remotely, but because of the radioactive corrosion products and neutron activation of steels, remote welding would also be required, even if the reactor is drained and the fuel removed. In fact, without the shielding of the water, the remote welding equipment would be susceptible to higher radiation levels, and as a result, the equipment may need to be replaced or scraped.

Underwater welding generally uses an arc induced plasma with or without a pressurized gas flow to exclude the liquid from the immediate vicinity of the weld. However, an exclusion medium which is necessary to protect an arc or flame of the torch providing the welding heat, and the resultant weld pool, is difficult to maintain by gas against hydrostatic pressures which occur at substantial depths.

A welding process that has been used to apply clad layers is Plasma Transferred Arc (PTA). In commonly owned and assigned patent application, Ser. No. 08/724,592 an underwater welding apparatus is disclosed for applying clad layers to repair cracks in structures under water. The subject of that patent application is a plasma transferred arc exclusion device that is designed for cladding of nuclear reactor internals with flat surfaces. It will not seal angular joint configurations to allow water exclusion and underwater fillet welding. The water exclusion device in said patent application is a metallic circular cylinder with wire mesh material joined to the edge which contacts the flat workpiece. The device is not able to weld angled joint configurations such as a "T" joint because the gas lens shield, the exclusion device, and the torch, do not fit tightly or at all, into the joint to be welded. There is interference between the torch nozzle and the gas lens shield with the sides of the substrate material to be welded. Also, the torch standoff distance from the joint area is such that a dry pressurized area can not be obtained to allow a sound weld. Thus there is a need for an apparatus having a torch nozzle, gas lens shield, and liquid exclusion device that fits angular configurations underwater to provide structural fillet welds.

SUMMARY OF THE INVENTION

This need is satisfied by the inventive apparatus for underwater welding of angled configurations. The apparatus forms a sealed pocket area which excludes water or other liquid fluent directly over a portion of the angled configuration that is to be welded, where said angled configuration is created by teeing two pieces of material together at an angle and joining them by fillet welding. The invention involves the creation of a special local gas-pressurized cavity at the end of a submerged plasma transferred arc torch which excludes water from the area to be weld, allowing a stable arc and sound fillet welds in the angled configuration. The angle is generally a right angle, i.e., 90 degrees, but can also be other angled configurations, for example, 45 degrees, 60 degrees, 120 degrees. Flat surfaces are not contemplated for welding with the apparatus of this invention. The term, sound fillet weld, means a defect-free weld joint. Defect-free means that there are no pores or cracks in the weld joint.

The underwater welding apparatus of this invention comprises a modified local exclusion device attached to a modified commercial plasma transferred arc torch where the gas lens shield and the nozzle are cut back and machined to fit the angular space between the two materials to be joined or repaired. A modified exclusion device is designed to attach to the gas lens shield or directly to the nozzle by using at least one O-ring, and preferably two O-rings, so as to seal against the mutually angled surfaces of a fillet weld specimen. For instance, the mutually angled surfaces would be perpendicular for a 90 degree weld specimen.

In one aspect of this invention there is provided an apparatus for underwater welding of angular joints comprising: a welding torch having a nozzle constructed to fit in an angled space of an angled workpiece for providing gas and heat to said angled workpiece to form a weld bead; a gas lens shield mounted over the torch, with a lower end that is in close proximity to said angled workpiece, and having at least one positioning means on the outer surface of said gas lens shield for contact with an upper end of an angled underwater exclusion device; the angled underwater exclusion device having a gas permeable skirt along an outer perimeter on a lower end of said exclusion device in contact with the angled workpiece, where said skirt has a flexible rear portion that travels over the weld bead, and said exclusion device being positioned over the gas lens shield by the positioning means; and a means for providing gas under pressure to the underwater exclusion device from at least the nozzle of the torch.

In another aspect of the invention, there is an apparatus for underwater fillet welding of angled workpieces comprising a plasma arc welding torch angled to fit the angled workpiece, means for supplying power to the torch, means for supplying gas to the torch, means for supplying metal filler to the torch, a gas lens shield mounted on a nozzle of said torch and fitted to be used with the angled workpiece, a truncated angled water exclusion device slidably mounted on a lower portion of the gas lens shield, said device having a gas permeable flexible member attached to the outer perimeter of an end of the device for compliant contact with the angled workpiece, and a positioning means on the outer surface of the gas lens shield in contact with an upper end of the water exclusion device for urging the device towards the angled workpiece.

Yet another aspect of the invention is a liquid exclusion device for underwater structural fillet welds comprising an inner tubular section with a truncated angled end for compliant contact with an angled workpiece, a gas permeable member on a perimeter of the truncated angle end with a flexible portion in the rear of the device to travel over weld beads as formed, and a spacer device in contact with the other end of the device.

Still in another aspect of this invention there is provided a method for making structural fillet welds underwater between angled surfaces of a workpiece comprising: forming a weld pool of a molten metal within an angled exclusion device in contact with said angled surfaces of the workpiece at a weld site; cooling the weld pool at the weld site to a temperature at about its melting point; and quenching the weld pool to an ambient temperature by contact with a quenching medium as the weld pool emerges from the exclusion device.

In yet another aspect of this invention there is included an underwater welding apparatus comprising a welding torch having a nozzle adapted to deliver heat to an angular configuration between two substrates to form a weld pool therebetween, an angular water exclusion device mounted on the torch with a positioning means comprising at least one O-ring and said exclusion device having a gas permeable skirt on an outside perimeter in contact with the angular configuration, said permeable skirt having a tail piece hinged on a rear of said exclusion device, and means for providing gas under pressure to the water exclusion device.

An object of this invention is to allow quality underwater structural fillet welding of angled workpieces to be accomplished at water depths of about 80 feet. Another object of this invention is to fillet weld rectangular scrap material longitudinally on the outside diameter of reactor internal piping in nuclear reactors to return structural integrity to cracked pipes.

DESCRIPTION OF THE INVENTION

Figure 1:
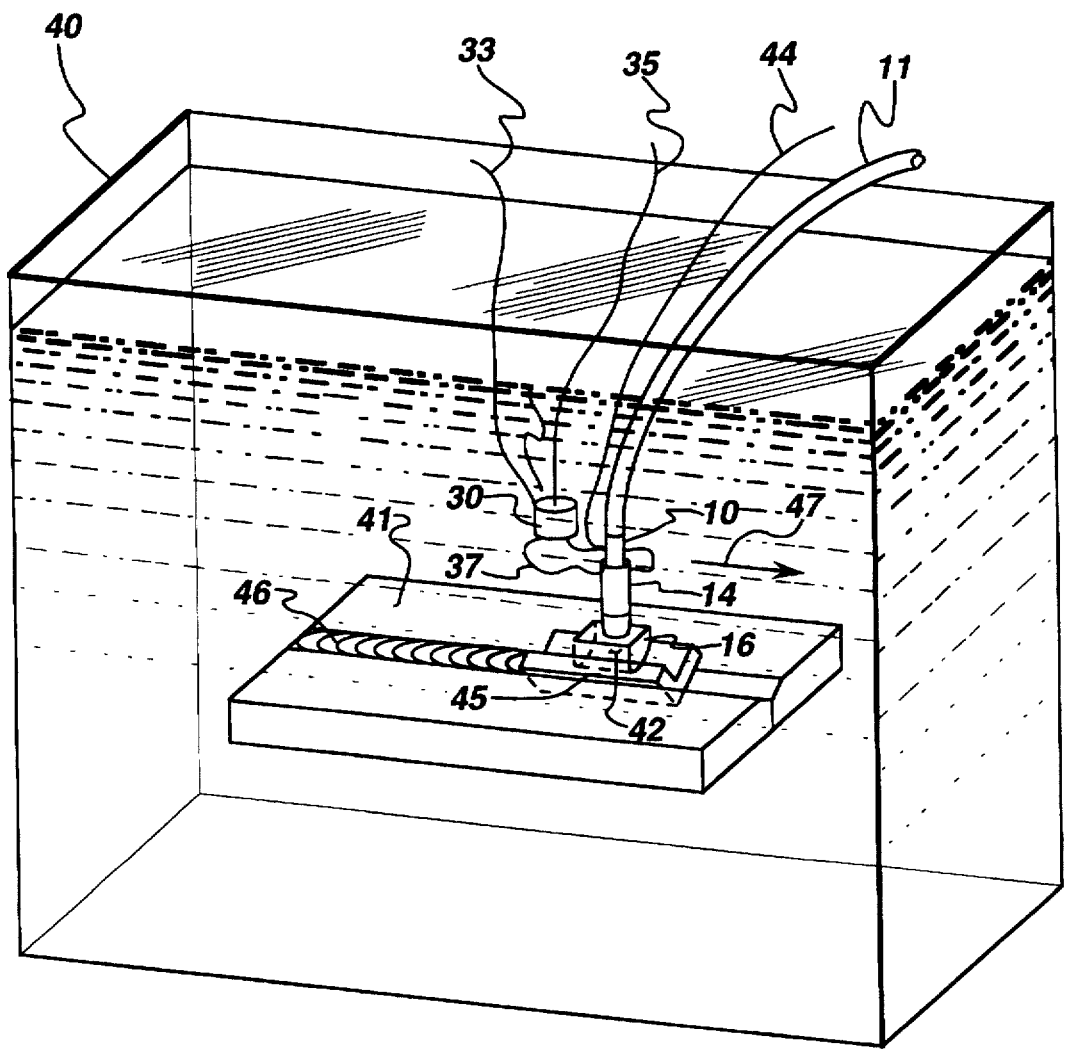
FIG. 1 is a schematic illustration of underwater welding of a "T" joint with an exclusion water apparatus.

This invention provides an underwater plasma transferred arc welding method and apparatus in which the nozzle of the welding torch and the associated gas lens shield are modified to fit an angular configuration with an adjustably mounted device which functions to exclude liquid from the arc and facilitates establishment of the arc at substantial depths. In the operation of a plasma transferred arc welding apparatus, the arc passes between the nozzle at the end of the torch and the grounded workpiece by displacing the water either by the action of the shielding gas or operating in a zone or chamber from which the liquid is excluded by a combination of mechanical exclusion and gas pressure within the mechanical device.

In order to perform structural fillet welds in angular configurations, the gas lens shield on the end of a plasma transferred arc torch is trimmed in length to prevent interference with the angled sides of the workpiece. The nozzle of the torch was reduced in size by machining to prevent interference with the angled sides of the workpiece while achieving a suitable standoff distance necessary to transfer the plasma arc to the workpiece. The torch nozzle is turned down due to the restrictive geometry of the teed joint to be welded in order to effect the reasonable standoff distance. An angular exclusion device is fitted to the surfaces to be welded and attaches to the gas lens shield or the nozzle by fitting over the O-ring. The angular exclusion device has a compliant woven wire material, spot welded to its outside perimeter in contact with the workpiece, that has a leading and trailing edge to seal the 90 degree angular region created by teeing two substrates. The trailing edge of the woven wire material on the angular exclusion device is hinged so as to provide a seal to the surface while being able to travel over a weld bead. As a result, this exclusion device allows compliance with the angled workpiece and the fillet weld bead as it is being deposited. The angular exclusion device allows controlled escape of pressurizing gas within the exclusion device, thus preventing a disruption of the arc by the collapse of large gas bubbles. The pressurizing gas is supplied by the plasma center gas and the shielding gas; all coming from within the nozzle and gas lens shield. An external supply of gas, if necessary, can be supplied from the angled exclusion device by joining a gas supply tube to the top of the angular exclusion device.

The underwater welding can be done at shallow or deep depths. Deep depths mean depths up to about 80 feet or greater, so long as one skilled in the art is able to maintain the exclusion device being pressurized at about the ambient pressure. The exclusion device is pressurized by the plasma jet from the nozzle, the shielding gas between the lens shield and the nozzle, and in addition further gas may be used attached to the exclusion device. The benefit of the pressurized exclusion device for underwater welding can be achieved with or without the use of filler metal.

The use of the plasma transferred arc welding with the exclusion device can further be used underwater to develop compressive stresses in the welded area, thereby preventing hot cracking, helium imbrittlement and to mitigate stress corrosion cracking. This invention develops the formation of residual compressive stresses in the melted and resolidified metal and adjacent heat affected zone of the material being welded. In the practice of the invention a local molten weld pool is formed by suitable heat source such as the welding torch within a protected exclusion zone from which the ambient environment is excluded. The exclusion device is attached to and moves with the torch or other heat supplying apparatus. As the torch within the angled exclusion device moves along the weld path of the angular configuration or workpiece, the weld pool begins to cool. As the weld pool or weld bead passes out of a protected zone under the angled exclusion device, the weld pool is exposed to the ambient environment which acts as a quenching medium (i.e. the water). The quenching medium rapidly cools the top surface of the weld and the heat affected zone of the material being treated. Heat is removed from the fused weld and surrounding material by conduction via the quenching medium rather than by convection as in conventional air welding. Some heat is dissipated by heat flow within the bulk material being treated. However, the major heat flow for the method of this invention is through the quench medium. The affect of this heat flow phenomena may provide the formation of compressive stresses in the weld and nearby heat affected zone or reduced tensile stresses.

The water exclusion device and the underwater welding apparatus for structural fillet welds of this invention will be more clearly understood when considered in the context of the underwater plasma arc welding as illustrated in the following figures.

FIG. 1 illustrates the making of a structural fillet weld. The submerged welding is schematically depicted by a fluid containing tank 40. The torch 10 with gas supply line 11, gas lens shield 14, and angled exclusion device 16 are shown assembled and located adjacent the surface of angular workpiece 41 at which the weld is to be made. Plasma 42 extends to that surface. The tank 40 can be pressurized to simulate varying depth. As illustrated in FIG. 1, fillet weld material in the form of powder is supplied through hose 35 to distribution means 30. Bled off transport gas is exhausted through hose 33 after pressure and flow regulation and powder separation. Powdered weld material is transported to torch 10 through hoses 39. Electrical power is supplied to the torch 10 and workpiece 41 through electrical connections 44. It should be noted that the weld material may be supplied as a wire feed in place of powder.

To make a weld, inert gas is supplied through hose 11 to develop an exclusion region and an arc is struck in torch 10 which supplies heat to surface 41 and develops a pool of molten metal 45 to which powdered weld material is supplied through hoses 39. The torch is moved in the direction indicated by arrow 47 with the weld pool 45 trailing behind the plasma 42. In FIG. 1, the tank 40 is a hyperbaric water tank. This tank is filled with water and then pressurized, with a gas overpressure, to simulate any desired depth up to about 120 feet of water. However, 120 feet is not necessarily the limit of the depth of water at which this invention will work. As previously stated above, the depth can be as deep as one skilled in the art desires to maintain the pressurized exclusion device. The torch 10 used in FIG. 1 is capable of immersion in water.

Figure 2:
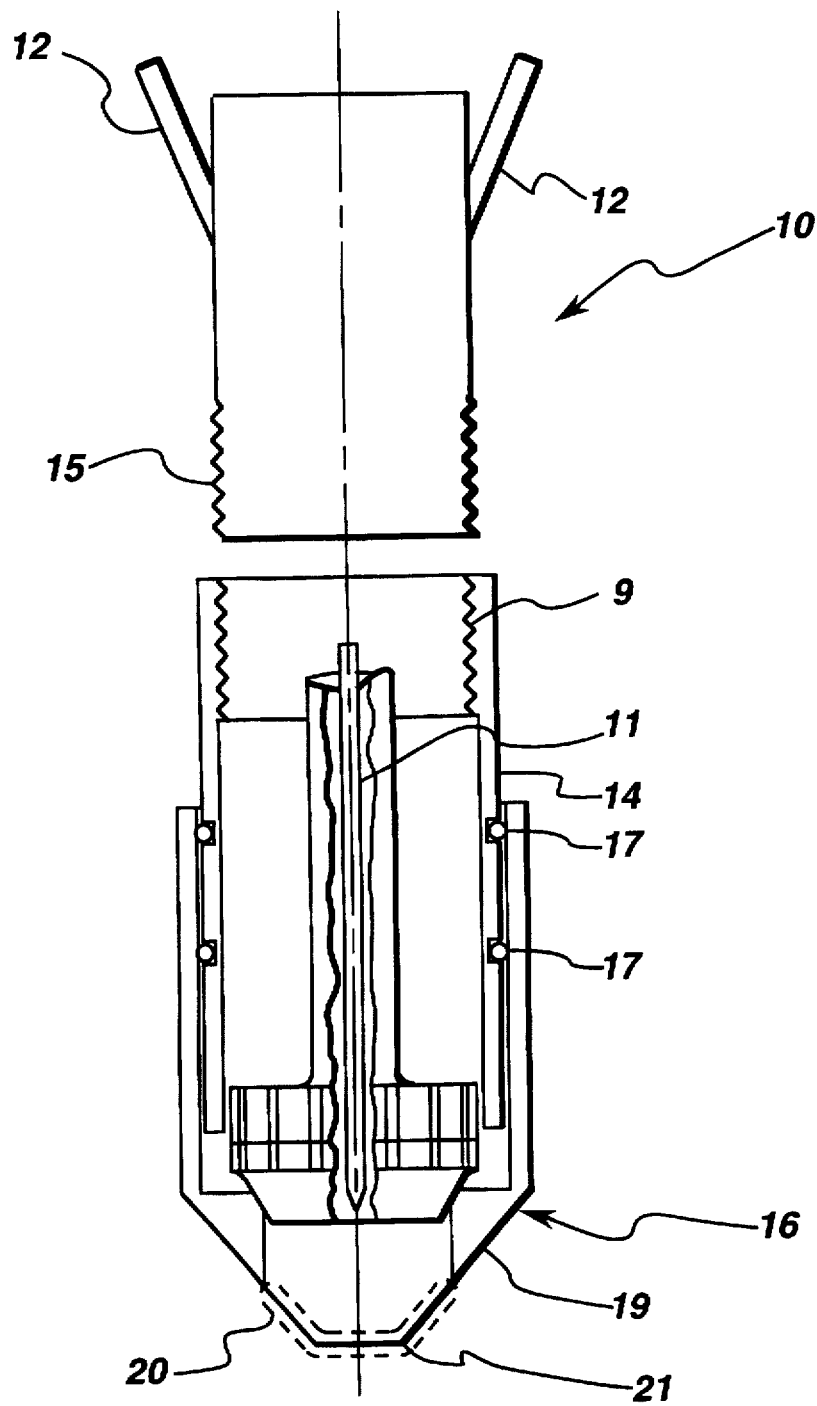
FIG. 2 is a cross sectional view of a torch, gas lens shield, and liquid exclusion device.

The torch 10 is shown in FIG. 2. A Plasmastron® rotofeed powder feeder may be employed to feed powder into the torch 10 by means of a separate argon carrier gas, which is separate from the argon of the plasma. Dual injection ports in the torch 10 may be employed. The exclusion device is pressurized with the argon of the plasma and powdered carrier gas.

Referring now to FIG. 2, the plasma transferred arc torch 10 includes an electrode, not shown, to which a voltage is applied appropriate to the maintenance of the welding arc and gas inlet 11 to receive a flow of gas which is intended to serve to regulate the plasma developed by the arc. The gas is generally divided into a so called plasma center gas flow around the central electrode for supplying gas to the plasma and a so called shielded gas flow which is normally intended to prevent oxidation of the weld pool and heat affected zone, and to displace ambient gases. These gas flows are modified and directed in the immediate vicinity of the arc plasma by a gas lens shield 14. The gas lens is provided with threads 9 which mate with threads 15 on the plasma transferred arc torch 10 for facility of replacement and interchange. Welding filler materials in the form of a powder may be introduced into the torch at inlets 12.

The exclusion device 16 as illustrated in FIG. 2 is tension mounted on the gas shield lens 14 with at least one O-ring 17 and preferably two O-rings 17. The body 19 of the exclusion device 16 is illustrated as an angular structure having a small angled front 21 and rear lower end, and angled sides to fit the 90 degree angular configuration of the substrate materials to be welded. Solidification of the weld should begin inside the exclusion region provided by the exclusion device.

A flexible surface-contacting skirt 20 which may be of a woven mesh material, such as Technit Strips, a product of Technit Corporation, Cranford, N.J., is attached to the bottom end of the exclusion device along the outer perimeter to provide compliance to the angled workpiece surface and weld bead as the weld is made and to provide for escape of gas. Skirt 20 may be fabricated of wire or fibers which can be woven or fitted. The escape of gas through the apertures in the skirt displaces liquids which would otherwise be forced into the exclusion device by hydrostatic pressure. The confinement of the gas by exclusion device 16 allows the exclusion zone to be maintained with reduced gas flow volume by maintaining a pressure in excess of the ambient hydrostatic pressure. While the exclusion region can be maintained by a combination of the plasma center gas and the shielding gas, such as argon, and also possibly supplemented to some degree by the powder carrier or transport gas, a separate gas supply can be provided for the exclusion device itself.

While use with a plasma transferred arc torch is described, the exclusion device can be used with any heat source including oxy-acetylene and carbon arc torches and tungsten inert gas torches, and gas metal arc torches as well as plasma torches in a manner described above with the exclusion device. Further, the method of the invention may be practiced using conventional welding rods, by continuous feed of the welding alloy in wire or powder form or by forming the weld pool autogenously from the substrate or bodies to be welded together in the angular joint.

Figure 3:
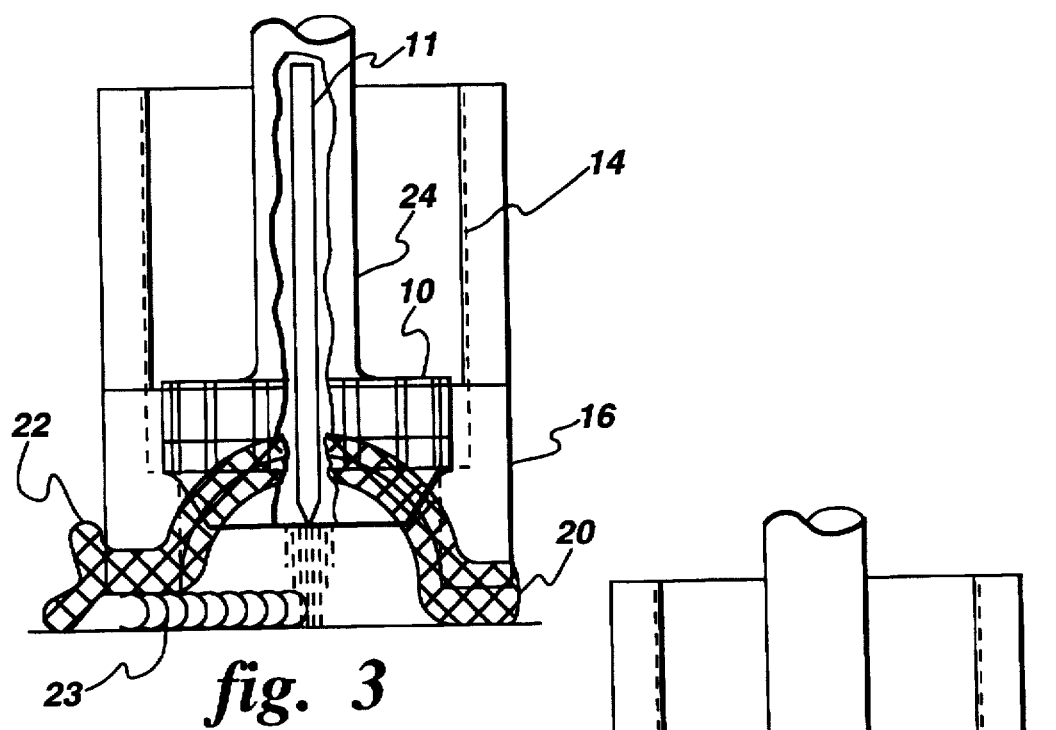
FIG. 3 is a cross sectional view of a liquid exclusion device slidably over a gas lens shield and torch showing the formation of weld beads or weld pool.
Figure 4:
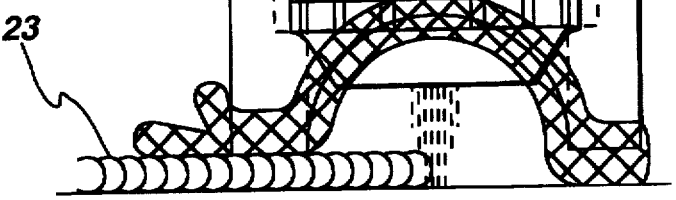
FIG. 4 is a cross sectional view of a liquid exclusion device showing the tail end of the device having a flexible member to seal against the weld beads or weld pool.
Figure 5:
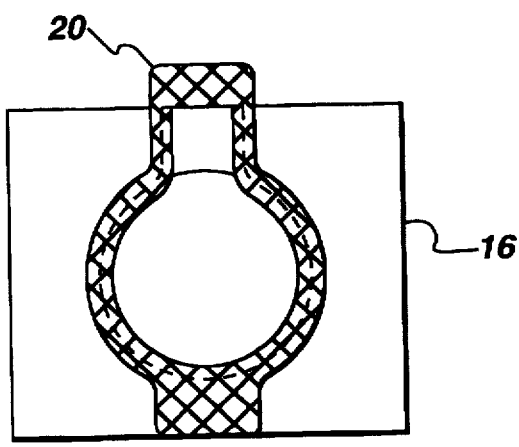
FIG. 5 is a bottom view of the lower end of the water exclusion device showing the portion that seals against the surface of the structural part being welded.

FIGS. 3, 4 and 5 illustrate a plasma transferred arc torch 10 which has an adjustable water exclusion device 16 slidably mounted on an O-ring on the gas shielding lens 14. The device as shown is adapted to use both powder and wire filler materials. If no filler material is used, the weld can be formed with metal from the workpiece. FIGS. 3 and 4 show a side view of the torch 10 with the exclusion device 16. The apparatus comprises torch body which is provided with central electrode 24, encased in a gas lens shield 14 fitted in the interior of the exclusion device 16. The mesh skirt 20 is shown with a flexible tail 22 to travel over the weld bead 23. The torch assembly is provided with the gas lens shield and spacer spring for urging water exclusion device into contact to the angled configured substrate or workpiece on which the weld bead is formed. FIG. 4 repeats FIG. 3 showing the flexible tail moving over the weld bead 23 as the torch goes forward.

FIG. 5 is a bottom view of the exclusion device 16 showing the mesh skirt 20 around the perimeter surface of the exclusion device that contacts the angled workpiece. The gas permeable wire mesh skirt 20 is secured in place on the water exclusion device by some adhesion means such as a series of resistance spot welds. The water-free exclusion zone within the cavity of the device is formed and operates by providing gas pressure within the water exclusion device.

The pressure is maintained at the desired level by control of the gas volume supplied by the torch gas supply. As gas seeps out through the mesh, water is prevented from flooding into the cavity of the water exclusion device. Thus, the use of the wire mesh skirt allows the internal gas to escape as small bubbles that are not detrimental to the weld bead.

Figure 6:
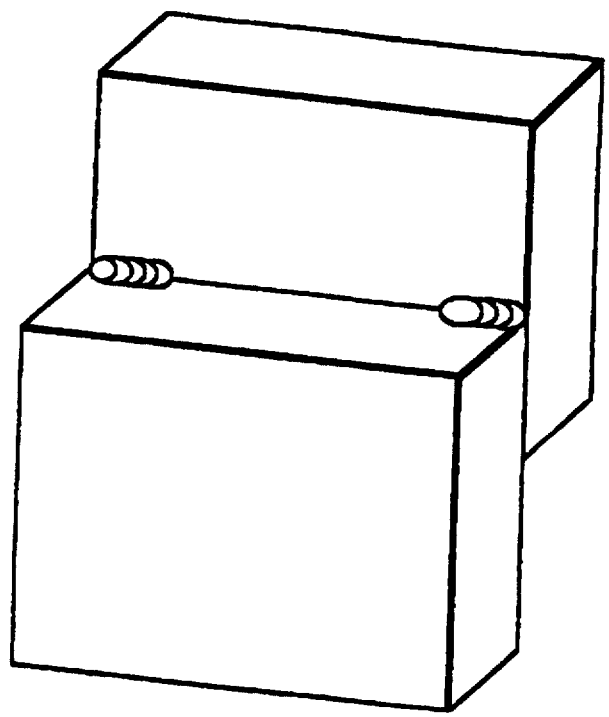
FIG. 6 is a schematic drawing of a structural fillet weld in a "T" joint.
Figure 7:
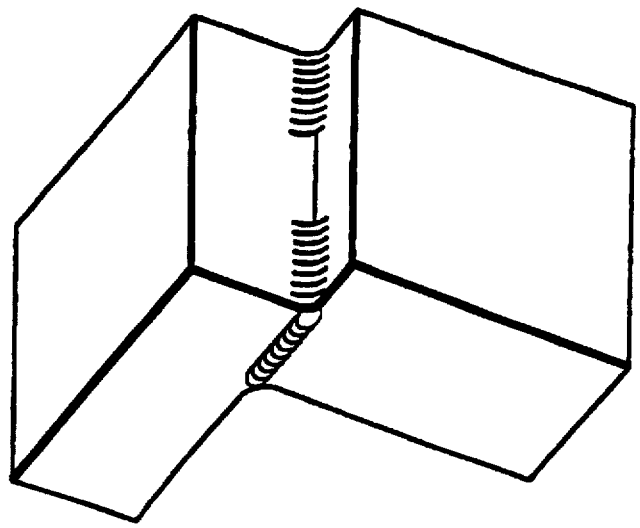
FIG. 7 is a schematic drawing of a structural fillet weld in a "T" joint.

FIGS. 6 and 7 demonstrate the T joint that is welded between two substrates materials having an angular configuration.

EXAMPLE 1

A plasma transferred arc process was developed for underwater cladding using an angled local exclusion device attached to a modified commercial plasma transferred arc torch that was originally designed for hardfacing and cladding in air. The exclusion device consisted of an angular solid stainless steel block with a circular inner portion that slid over an O-ring on the gas lens shield of the torch. A compliant layer of woven wire mesh Technit material was resistance spot welded to the substrate contacting edge of the exclusion device on the outer perimeter. In the process, the plasma transferred arc torch gases filled the exclusion device and escaped through the Technit material as it slid on the angled substrate surface, providing a local dry region within which sound welds were made. The gas lens and nozzle were modified to fit into a 90 degree angle of substrate material to form a fillet weld on the 90 degree workpiece specimen. The exclusion device was designed to attach to the gas lens shield and seal against the mutually perpendicular surfaces of the 90 degree fillet weld specimens. The Technit material was spot welded on the sides of the truncated triangular portion of the exclusion device to further seal against the specimen sides. Additional Technit material was added on the half inch flaps at the front and back to seal with the v-notch. The flaps were made one half inch wide to allow for the possibility of a quarter inch weld bead buildup, measured from the root of the specimen. The Technit material on the half inch flap on the back of the exclusion device was compliant enough to ride over the fillet weld as it was being made, maintaining the required water seal while welding.

The fillet weld specimens were made by butting one half of a 1" edge of a ½" thick×½" wide×4 inches long 304 stainless steel bar stock to a 2"×4" face of a 1"×2"×4" plate of the same material. Critical surfaces were milled to assure perpendicularity. The butted plates were gas tungsten arc welded together to create an L shaped specimen with perpendicular ½"×4" surface planes. The exclusion device had a 2" overall length so that only the center 2" portion of each specimen could be plasma transfer arc welded while maintaining a water seal at the start and end of the welding process. The test specimen was tack-welded to a 1"×2"×4" plate to facilitate mounting of the test specimen on the linear motion mechanism within the hyperbaric chamber.

Filler metal addition was performed with a mechanized wire feed system using 0.035 inch diameter, ER308L filler metal. Filler metal was added into the leading edge of the weld pool with respect to the direction of travel. Initially, the wire guide tube was inserted through the Technit material on the front ½ inch flat of the exclusion device.

The starting parameters were chosen based on underwater plasma transferred arc cladding experience with the aim of producing a fillet weld with a ¼ inch throat depth. Parameter changes were made as experimental results warranted them. All trials were made at a simulated water depth of 80 feet. Other common conditions included the use of a machined down 5/32 inch orifice torch nozzle and ⅛ inch diameter electrode. With a ½ inch flap section that is flexible on the back of the Technit material on the back of the exclusion device an acceptable fillet weld was made. The gas used in this example was argon.

What is claimed:

1. An apparatus for underwater welding angular joints comprising:

a welding torch having a nozzle constructed to fit in an angled space of an angled workpiece for providing gas and heat to said angled workpiece underwater to form a weld bead;

a gas lens shield mounted over the torch, with a lower end that is in close proximity to said angled workpiece, and having at least one positioning means on the outer surface of said gas lens shield for contact with an upper end of an angled underwater exclusion device;

the angled underwater exclusion device having a gas permable skirt along an outer perimeter on a lower end of said exclusion device in contact with the angled workpiece, where said skirt has a flexible trailing tail piece hinged on a rear portion that travels over the weld bead, and said exclusion device being tension mounted over the gas lens shield by the positioning means; and a means for providing gas under pressure to the underwater exclusion device from at least the nozzle of the torch.

2. An apparatus according to claim 1 where the welding torch is a plasma transferred arc torch.

3. An apparatus according to claim 1 where the positioning means is an O-ring.

4. An apparatus according to claim 1 where the gas permeable skirt is a mesh metal wire.

5. An apparatus according to claim 1 where said angled workpiece forms a 90 degree angle at weld site.

6. An apparatus according to claim 5 where said weld site forms a "T" joint.

7. An apparatus for underwater fillet welding of angled workpieces comprising:

a plasma arc welding torch angled to fit the angled workpiece, means for supplying power to the torch, means for supplying gas to the torch, means for supplying metal filler to the torch, a gas lens shield mounted on a nozzle of said torch and fitted to be used with the angled workpiece, a truncated angled water exclusion device slidably mounted on a lower portion of the gas lens shield, said device having a gas permeable flexible member attached to the outer perimeter of an end of the device for compliant contact with the angled workpiece, where said gas permeable flexible member has a flexible trailing tail piece hinged on a rear portion that travels over a weld bead, and a positioning means on the outer surface of the gas lens shield in contact with an upper end of the water exclusion device for urging the device towards the angled workpiece.

8. A liquid exclusion device for underwater structural fillet welds of angled parts comprising: an inner tubular section with a truncated angled end for compliant contact with an angled workpiece, a gas permeable member on a perimeter of the truncated angle end with a flexible trailing tail piece hinged in the rear of the device to travel over weld beads as formed, and a spacer device in contact with the opposite end of the liquid exclusion device.

9. A method for making structural fillet welds underwater between angled surfaces of a workpiece comprising: forming a weld pool of a molten metal within an angled exclusion device in contact with said angled surfaces of the workpiece at a weld site; cooling the weld pool at the weld site to a temperature at about its melting point; and quenching the weld pool to an ambient temperature by contact with a quenching medium as the weld pool emerges from the exclusion device.

10. An underwater welding apparatus comprising a welding torch having a nozzle adapted to deliver heat to an angular configuration between two substrates to form a weld pool therebetween, an angular water exclusion device tension mounted on the torch with a positioning means comprising at least one O-ring and said exclusion device having a gas permeable skirt on an outside perimeter in contact with the angular configuration, said permeable skirt having a flexible trailing tail piece hinged on a rear of said exclusion device, and means for providing gas under pressure to the water exclusion device.

* * * * *